J. C. BRAUD.
Rice-Planter.

No. 159,148.

Patented Jan. 26, 1875.

WITNESSES

INVENTOR

Joseph C. Braud
By Knight Bros Attorneys

UNITED STATES PATENT OFFICE.

JOSEPH C. BRAUD, OF THIBODEAUX, LOUISIANA.

IMPROVEMENT IN RICE-PLANTERS.

Specification forming part of Letters Patent No. 159,148, dated January 26, 1875; application filed October 16, 1874.

*To all whom it may concern:*

Be it known that I, JOSEPH C. BRAUD, of Thibodeaux, in the parish of La Fourche and State of Louisiana, have invented an Improved Rice-Planter, of which the following is a specification:

This invention relates to what are termed "walking-planters," which are controlled by an operator or driver walking behind; and it relates particularly to means for sowing rice in drills. The present invention consists, primarily, in peculiar means for opening, closing, and adjusting discharge-apertures in a rotary seed-cylinder or hopper, so as to provide for stopping the flow of seed in turning on the headland to prevent waste, and for promptly starting the discharge at the will of the operator, and for regulating the discharge with facility, as may be required. The invention consists, further, in a peculiar gang of plows arranged and operating relatively to and in combination with a seed-chute adapted to receive the discharge of the seed-cylinder, as hereinafter set forth, the same serving to break the ground and to deposit the seed and to cover it, at one continuous operation.

Figure 1:
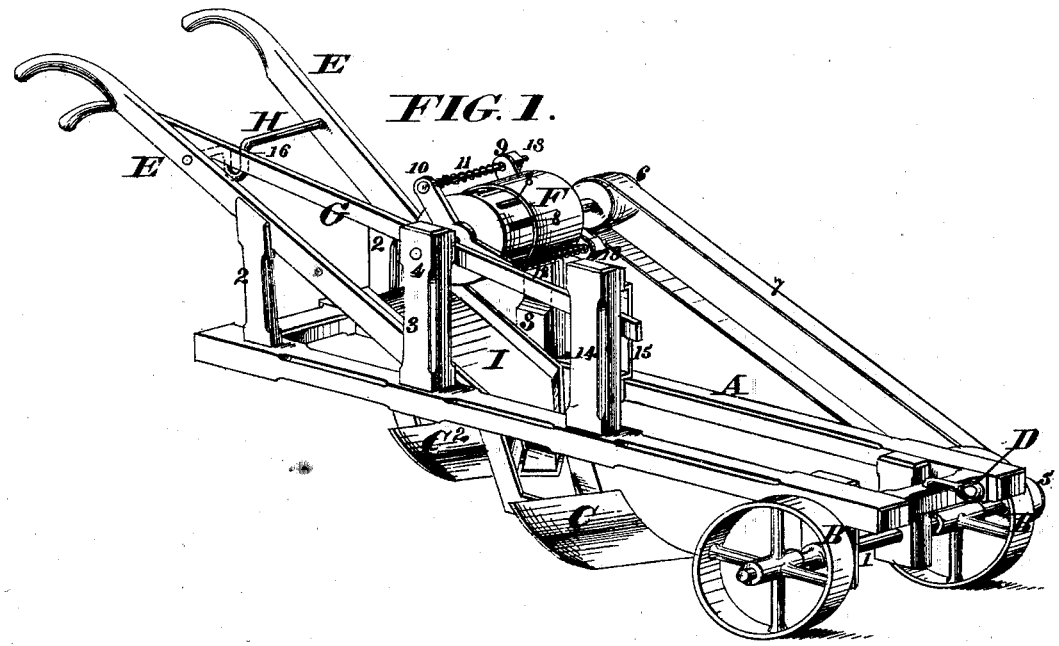
Figure 2:
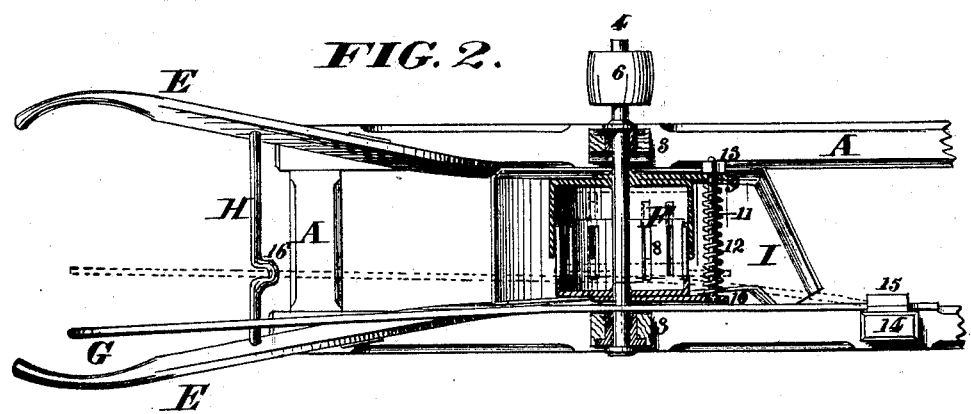

In the accompanying drawing, Figure 1 is a perspective view of this improved rice-planter. Fig. 2 is a plan view of the same, partly in horizontal section, some of the parts being shown in different positions by full and dotted lines.

This planter has a light horizontal frame, A, supported near the ground by a pair of low wheels, B B, on a rotary axle, 1, at its front end, and a pair of plows or plow-shares, C C², of which the hindmost is at or near the rear end of the frame. The rotary axle is journaled in hanger-brackets, and the plows C C² are attached to the frame by rigid standards in ordinary manner. A clevis, D, at the front end of the frame, provides for attaching a draft animal or team, and a pair of plow-handles, E E, at the rear end of the frame, provide for guiding the implement by hand. The handles E extend upward from a point behind the front plow, and are supported by standards 2 at the rear end of the frame. A pair of standards, 3, at the lower end of the handles on the frame A, support, at their upper ends, a horizontal rotary shaft, 4, carrying a seed-cylinder or rotary hopper, F, of peculiar construction The rotary axle 1 of the ground-wheels B, and the rotary shaft 4 of the seed-cylinder F, are extended on the same side of the machine and provided with pulleys 5 6, to which a band, 7, is applied for transmitting continuous rotary motion to the seed-cylinder during the movements of the machine. The seed-cylinder F is composed of two transverse sections, one of which is attached fixedly to the rotary shaft 4, and the other is made of less diameter, and slides on the shaft and within the fixed section. Discharge-apertures are formed or provided by longitudinal slots 8 in the periphery of the sliding section of the seed-cylinder, and these may be made of different lengths, as in the illustration, to provide for closing them successively by limiting the outward movement of the sliding section more or less. For opening the discharge-apertures and retaining the sections of the seed-cylinder at the proper or required distance apart, radial arms or lugs 9 10 are provided at the respective ends of the cylinder, and between the extremities of these longitudinal bolts 11 are applied, the latter being provided with expanding-springs 12 between the arms or lugs, and adjusting-nuts 13 outside of the arms or lugs 9. The springs 12 operate automatically to expand the seed-cylinder, so as to open the discharge-apertures, and by adjusting the nuts 13, the total area of aperture which can be thus opened is regulated with nicety and with facility.

For closing the discharge-apertures and locking the cylinder in closed condition for the object, primarily, of stopping the flow of seed, so as to prevent waste in turning on the headland, a hand-lever, G, is applied to the sliding section of the cylinder in peculiar manner. This lever is pivoted on the shaft 4 of the seed-cylinder for vertical movement, and extends forward from this point to a fulcrum-post, 14, having a guide strap or staple, 15, on its inner side. The rear end of the lever terminates in a handle between the extremities of the plow-handles E, and rests on or over a cross-bar, H, between the handles, having a notch or detent, 16. While the machine is at work the lever remains in the right-hand end of the cross-bar, as shown in Fig. 1, and in full lines in Fig. 2. By turning the lever on the shaft 4 it is withdrawn from or forced into the retaining-notch 16, and the strap or staple 15 permits this movement. By pressing it laterally to the left, with the post 14 as a fulcrum, it forces the sliding section of the seed-cylinder inward against the pressure of the springs 12 and closes the discharge-apertures, as illustrated in dotted lines in Fig. 2. The retaining notch or detent 16 is so arranged as to be beneath it in this last-named position, and serves to lock the seed-cylinder in closed condition. The driver can consequently withdraw his attention from the planting-mechanism while turning, and any waste of seed is prevented. Beneath the seed-cylinder F a broad seed-chute, I, is arranged to receive the seed from the discharge-apertures, and to deliver the same beneath the mold-board of the front plow or share C. This chute is supported in inclined position by the lower ends of the handles E, to which it is attached, and its lower end is bent laterally, so as to deflect the seed from the center of the machine to the side, as required. The plows C C² are arranged diagonally beneath the frame, with mold-boards on the same side, and the front plow serves to open a furrow, into which the seed is deposited by the chute I, and the plow C² turns a second furrow-slice over the deposited seed. The planting operation is thus completed, and the whole work is done with light draft and without strain on the driver or operator in any respect.

The rotary seed cylinder or hopper, broadly considered, is disclaimed, as also the combination of furrowing and covering plows or shares with a planter, and other general features of the machine not hereinafter specified as new.

The improved rice-planter may be made with a single plow or furrowing-share in connection with the improved mechanism for effecting, regulating, and stopping the delivery of the seed.

The following is claimed as new in this invention, namely—

1. The hand-lever G, fulcrum-post 14, and notched cross-bar H, between the handles, in combination with the rotary seed cylinder or hopper F, having a sliding section with discharge-apertures therein for closing the latter and locking the cylinder in closed condition, to prevent waste of seed, in the manner herein set forth.

2. The combination of the closing-lever G, locking-bar H, opening-springs 12, and adjusting-nuts 13 with the rotary seed-cylinder F, constructed as described, for the purposes specified.

3. The combination of the plows or shares C C², arranged diagonally beneath the planter, with mold-boards on one and the same side, and the seed-chute I, arranged to receive the seed from the discharge-apertures and to deliver the same beneath the mold-board of the front plow, the rear plow serving to cover the seed, as herein shown and described, for the purposes set forth.

JOSEPH C. BRAUD.

Witnesses:
L. A. WEBRE,
ARSÈNE BERGERON.